Patented Feb. 14, 1939

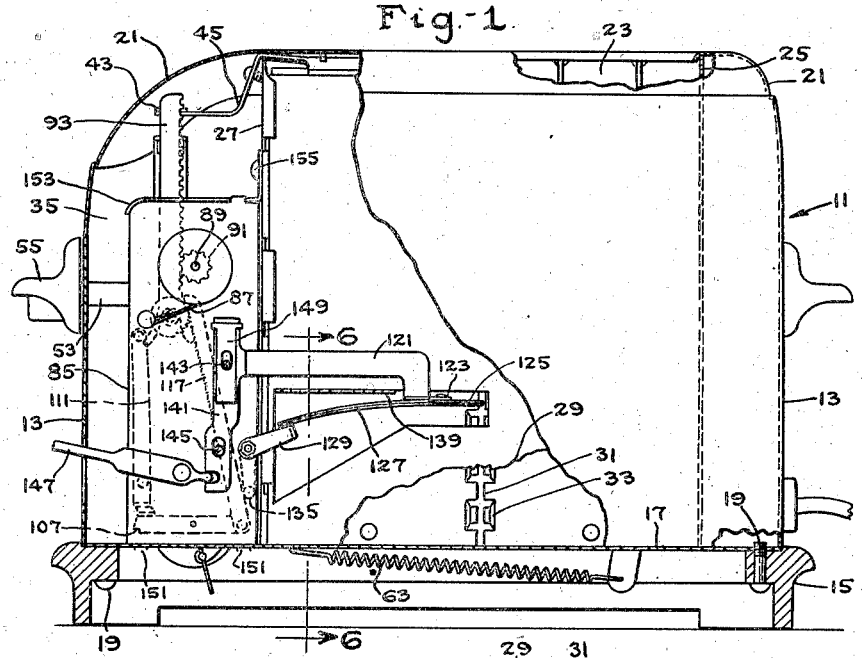

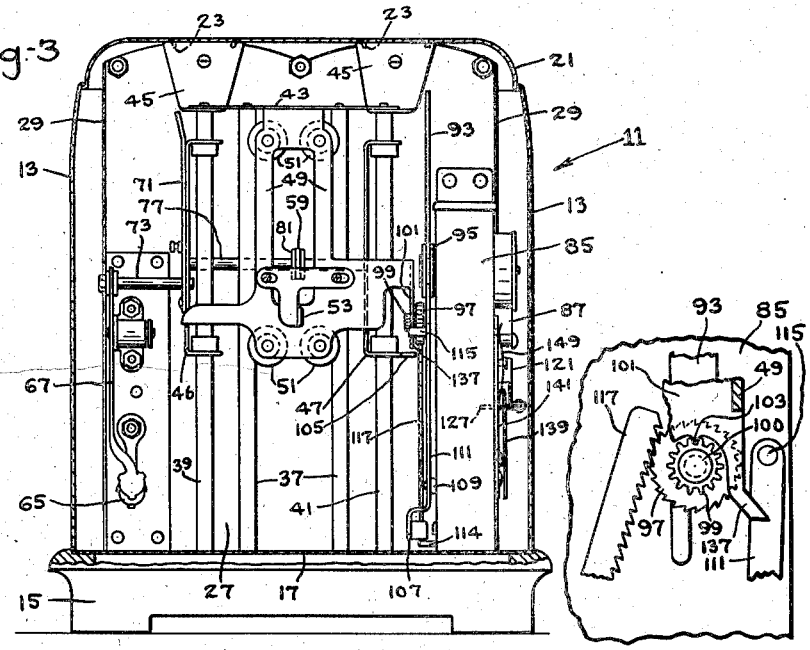

2,147,386

UNITED STATES PATENT OFFICE 2,147,386

AUTOMATIC TOASTER

Robert Sardeson, Minneapolis, Minn., assignor to McGraw Electric Company, Chicago, Ill., a corporation of Delaware Application March 15, 1937, Serial No. 130,926

20 Claims. (Cl. 219—19)

My invention relates to electric toasters and particularly to automatic electric toasters.

An object of my invention is to provide a toaster, the operating period of which is controlled by a constant speed mechanical timer, having associated therewith a thermally-actuable element to insure uniform toasting of successive slices of bread.

Another object of my invention is to provide an electric toaster having a thermally controlled timing mechanism in which a positively interlocking means shall be provided to insure release of a latch and termination of an operating period of the toaster at a desired time.

Another object of my invention is to provide a relatively simple and efficient construction of a thermally controllable constant speed mechanical timer that shall be quickly and easily installed in its proper operative position in a toaster.

Another object of my invention is to provide an automatic toaster comprising a constant speed mechanical timer having an operating period greater than is normally required to properly toast a slice of bread and a thermally-actuable element supported solely by the timer and adapted to reduce the operating period of the toaster for an initial and for succeeding operations in accordance with toaster temperature.

Another object of my invention is to provide an automatic toaster comprising a constant speed mechanical timer and a cooperating thermally-actuable element to control the operating period of the toaster in accordance with changes in toaster temperature, said timer being free to unwind fully irrespective of when the toasting operation is completed.

Another object of my invention is to provide an automatic toaster comprising a constant speed mechanical timer and a compensated bimetal thermostat having a negligible time lag of response to temperature changes and adapted to cooperate with the timer to vary the operating period of a toaster in close accordance with changes in toaster temperature.

Other objects of my invention will either be apparent from a description of one form of device embodying my invention or will be pointed out in the course of such description.

In the drawings,

Figure 1 is a view, mainly in side elevation, with parts broken away, of an electric toaster with which is associated the device more particularly embodying my invention, Fig. 2 is a view, in side elevation thereof, taken from the other side of the toaster and with parts broken away to show interior details of construction, Fig. 3 is a view in front elevation thereof, with the front part of the casing removed, Fig. 4 is a fragmentary perspective view of an interlock element used in the device embodying my invention, Fig. 5 is a view, in side elevation, of a unitary thermally controllable timing mechanism, Fig. 6 is a fragmentary view in perspective, showing the position of the thermal element relatively to the heating element, the section being taken on the line 6—6 of Fig. 1, Fig. 7 is a fragmentary cross sectional view of one detail of the device embodying my invention, taken on line 7—7 of Fig. 5, and, Fig. 8 is a fragmentary view in side elevation and on an enlarged scale, of certain parts of the device embodying my invention, shown in engaged position.

A toaster 11 of the vertical type, includes a casing 13 comprising front, side and rear walls, the lower edges of which are adapted to rest upon a frame 15 of molded material, and a bottom plate 17, which plate is adapted to be held against the hollow base frame 15 by a suitable number of screws 19. The casing includes further a cover member 21 which is adapted to interfit with the inturned top edge of the walls 13 to be held thereby in proper operative position. The cover 21 is provided with one or more openings 23 therein to permit of inserting slices of bread into the toaster to be toasted therein and of removing them therefrom after each toasting operation.

The toaster structure includes also a rear intermediate wall 25 and a front intermediate wall 27, which walls are adapted to cooperate with baffle plates 29 located at the respective sides of the toaster spaced from the side walls of the casing.

Electric heating means are provided for each slice of bread which is to be toasted, each heating means including one or more thin sheets 31 of electric-insulating material, such as mica, upon which is wound a resistor strip or wire 33. A pair of these heating elements is provided for each slice of bread and they are spaced apart a suitable distance with substantially all of the resistor element located at that side of its support facing the cooperating heating element so that a slice of bread may be subjected on both of its sides to radiant heat of relatively high temperature. To this end, the resistor elements are adapted to be traversed by an electric current of such intensity as to cause the resistor to operate at dull red heat or even at bright red heat.

The front and rear intermediate walls and the baffle plates are adapted to cooperate with each other to define a toasting chamber and the front intermediate wall 27 is adapted to cooperate with the front wall of the casing and portions of the side walls to define a mechanism chamber 35.

A pair of vertically extending rods 37 are provided in the mechanism chamber and additional rods 39 and 41 are also provided adjacent to and at one side of each of the rods 37. All of these rods may have the lower ends interfitting with the plate 17 and their upper ends may be held by a cross bar 43, as well as by longitudinally extending top frames 45, which frames are provided with openings registering with the openings 23 so that a slice of bread may be inserted into and removed from the toasting chamber.

A slider 46 is adapted to be moved vertically on rod 39 and a similar slider 47 is adapted to be moved on rod 41. Movement of these sliders may be effected manually by a carriage 49 having rollers 51 mounted thereon to engage the rods 37 and reduce the friction therebetween. Carriage 49 has a forwardly extending portion 53, loosely mounted thereon, which member may extend through a slot in the front wall of the toaster and have mounted thereon an actuating knob 55 to permit an operator to effect downward movement of the carriage and of the sliders by properly engaging portions thereon.

Means to control the energization of the heating elements includes a bell crank lever pivotally mounted at 57 on the rear intermediate wall 25, which lever has an arm 59 extending forwardly towards the mechanism chamber and a depending shorter arm 61 to the lower end of which is connected one end of a biasing spring 63, the other end of which is hooked into a suitable part of the plate 17 near the front thereof. A substantially fixed contact member 65 is insulatedly mounted on the front intermediate wall 27 and a contact arm 67 is effected by a slotted plate 71 secured to slider 46 and a laterally extending rod 73 secured to the upper end of contact arm 67, which rod is adapted to move in the slotted plate 71 when the same is moved downwardly by carriage 49.

One or more bread slice supports 75 extend longitudinally of the toaster and have their front portions secured together by a rod 77 (see Fig. 3 of the drawings) which rod is secured also to sliders 46 and 47 so that the bread slice supports, the two sliders and the plate 71 will move as a unit. The front end of arm 59 is slotted as at 79 to receive a roller 81 on rod 77. If knob 55 is moved downwardly by an operator, the two sliders 46 and 47, the slotted plate 71 and the bread slice supports 75 will be moved downwardly and at the same time contact arm 67 will be caused to engage the insulatedly supported fixed contact 65, it being understood that suitable connections have been made between the terminals 83 of the toaster and with an energizing circuit, and that the heating elements are adapted to be energized when the switch is closed. It will be noted that a single means is used to effect all of these operations.

These details of a toaster of this kind are already old and well known in the art and detailed reference is made thereto in order to more particularly point out the construction and operation of parts particularly embodying my invention and now to be described in detail.

Means for controlling the duration of a toasting operation in accordance with or depending on the temperature of the toaster includes a mechanical timer 85 which comprises a spring 87 mounted on a spring shaft 89 which has a pinion 91 fixed thereon and adapted to be engaged by a vertically movable rack bar 93, the rack bar being held in proper operative position relative to pinion 91 by a grooved roller 95.

A ratchet wheel 97 is fixedly mounted on an extension of a pinion 99 to turn therewith, both being loosely supported on a pin 100, which pin is fixedly mounted on rack bar 93 near the lower end thereof. Carriage 49 is provided with a depending portion 101 shown in detail in Fig. 4 of the drawings as being of substantially inverted V-shape in its lower edge, and having a centrally located tooth 103 therein for a purpose to be hereinafter set forth in detail. When carriage 49 is moved downwardly, portion 101 is adapted to fit over pinion 99, the tooth 103 being adapted to fit into one of the spaces between the teeth of pinion 99 to hold the pinion and ratchet wheel against turning as long as such inter-engagement exists.

The lower end of slider 47 is provided with a lateral projection 105 which is adapted to be moved below a part 107 of a plural arm latch means pivotally mounted on the timer frame or casing at 109, and having a substantially vertically extending arm 111 and a substantially horizontally extending arm 113. A light spring 112 biases the latch in a counterclockwise direction against a stop pin 114. A pin 115 is mounted at the upper end of arm 111 and extends laterally therefrom as will be more particularly noted in Fig. 5 of the drawings. A ratchet lever 117 is pivotally mounted at the outer end of arm 113 and is held in a predetermined inoperative position by a spring 119, this position being that in which it is out of engagement with ratchet wheel 97, with which it is adapted to interfit to effect release of the latch and therefore return of the bread slice supports to their upper position and consequent opening of the control switch.

A supporting bracket arm 121 (see Fig. 1 of the drawings) is adjustably mounted on one side wall of the timer as shown in that figure of the drawings and extends toward the rear of the toaster structure, the rear end being provided with a lateral extension 123 to which one end of a compensating bimetal bar 125 is secured. A main bimetal bar 127 is longer than is bar 125, preferably integral therewith and located in spaced side-by-side position relative thereto and closer to the heating element than is bar 125.

The free end of main bimetal bar 127 is adapted to engage one arm 129 of a compound or built-up bell crank lever including, in addition to the arm 129, a pivotally mounted pin 131, a second arm 133 having a laterally extending roller 135 thereon, which roller is adapted to engage ratchet lever 117 to cause a turning movement thereof in a clock-wise direction (as seen in Fig. 5 of the drawings) on its pivotal mounting on arm 113 of the latching means.

If it be assumed, for purposes of explanation, that the toaster is operated without energization of the heating means, the main bimetal bar 127 will remain in substantially the position shown in Fig. 5 of the drawings, that is, out of engagement with the bell crank lever arm 129 so that the ratchet lever 117 will be out of engagement with the ratchet wheel 97. During the time that the carriage is moved downwardly by an operator and is being returned to its uppermost position, pinion 99 will interfit with tooth 103 in portion 101 on the carriage, and, when the carriage has reached substantially its uppermost position, the angularly-extending face 137 of portion 101 will engage pin 115 on arm 111 of the plural arm latch and actuate it to effect release of the sliders and permit upward movement of the bread slice support and opening of the switch.

Reference may now be had particularly to Fig. 6 of the drawings, showing the location of the thermally-actuable element cooperating with the mechanical timer to vary the duration or time interval of an operating period of the toaster. It may be here pointed out that the duration of an operating period of the timer is greater than is normally required to toast a slice of bread under average operating conditions, in order to be able to toast to a high degree a slice of moist bread when the heating elements are energized from an electric circuit of abnormally low voltage. The thermostatic element therefore normally becomes operative to reduce the duration of an operating period of the toaster even in the first cycle of operation starting with a cold toaster. It is however possible to build a toaster in whch the operating period of the timer is used in full for the first cycle of operation, but in the interest of accurate regulation this is not the most desirable form. It will be noted that main bimetal bar 127, the free end of which is adapted to engage arm 129, is positioned to receive high temperature radiant heat directly from the adjacent heating element. The baffle plate 29 has a laterally-bent portion 139 which extends over the bimetal bar and laterally outwardly directly beneath the bracket arm 121. The auxiliary or compensating bimetal bar 125 is therefore located in a heat zone of different temperature than is the main bimetal bar, and it will be obvious that the temperature of the heat zone in which compensating bimetal bar 125 is located, is somewhat lower than is the temperature of the zone in which main bimetal bar 127 is located. It may also be pointed out that auxiliary bimetal bar 125 receives some of its heat by conduction from the main bimetal bar 127, as well as from the bracket 121.

The main bimetal bar 127 is located so that it is adapted to be subjected to a closed circuit convection current of heating air moving both upwardly and downwardly in the space between the resistor support 31 and the baffle plate 39. This convection current of heating air is of course caused by the adjacent heating element and has a temperature which is only slightly lower than the temperature of the heating element itself.

Compensating bimetal bar 125 is also adapted to be subjected to a closed circuit convection current of heating air flowing upwardly closely adjacent to baffle plate 29 and downwardly adjacent to casing 13, this convection current of air having a somewhat lower temperature than the current which flows between the heating element and the baffle plate.

As is now well known in the art, a shorter time is required to toast a slice of bread when a toaster is heated than when it is cold, and the main bimetal bar 127 is adapted to flex downwardly with increase in toaster temperature to effect a turning movement of ratchet bar 117 around its pivotal support (in a clock-wise direction as seen in Fig. 5) to thereby cause it to engage with ratchet wheel 97. As has already hereinbefore been stated, pinion 99 is fixedly mounted with ratchet wheel 97 on the same shaft and pinion 99 is adapted to be held against turning movement during a toasting operation while the rack bar is moved upwardly because of the interfit of tooth 103 with pinion 99. The result of this is that irrespective of when the ratchet lever 117 engages with ratchet wheel 97, a substantially immediate interlock therebetween will result, ratchet lever 117 will be moved upwardly through a small distance causing an opening or releasing movement of the latch and quick upward movement of the bread slice supports and simultaneous opening of the switch.

The upward movement of the bread slice supports carries with it, of course, carriage 49 so that immediately after termination of a toasting operation and before the end of an operating period of the timer, the interlocking engagement between carriage 49 and particularly tooth 103 with pinion 99 will cease and, even though ratchet lever 117 should continue in engagement with ratchet wheel 97, rack bar 93 may continue to move upwardly as the timer spring unwinds because it is now possible for ratchet wheel 97 and pinion 99 to turn on pin 100. This has the very important advantage that, irrespective of when a toasting operation is terminated before the end of an operating period of the timer, the constant speed timer may unwind fully, if permitted to do so. It may also be noted that an operator may terminate a toasting operation at any time by raising carriage 49 (as by means of knob 55) until edge 137 engages pin 115 on the latch to release the same.

For illustrative purposes, it may be mentioned that the operating period of a mechanical timer of this kind may be from 2½ minutes to 3 minutes, the operating period of a toaster in the first operation, during which the toaster begins to heat, may be on the order of say 2 minutes, while the duration of a toasting operation when the toaster has been heated to its maximum extent may be as low as say 40 seconds. It will therefore be evident that a toasting operation in a fully heated toaster may be terminated well before termination of an operating period of the timer and it is of course very desirable to permit the timer spring to unwind to its initial condition. This unwinding may, of course, not be permitted by the operator who may quickly remove the toasted slices of bread and insert fresh slices of bread and start another toasting operation before the timer has fully unwound. However, when the toaster is not used for say 2 minutes or over, the timer spring can unwind fully.

Means for varying the operating period of the toaster may include a supporting bar 141 for bracket arm 121, movable relatively to the timer on fixed pins 143 and 145, a manually actuable pivotally mounted lever arm 147 being provided which interfits with member 141. Any suitable or desired means for holding member 141 against the side plate of the timer may be provided, and in this case, includes a bowed spring plate 149 interfitting with pin 143.

Fig. 1 illustrates the condition where the temperature of the toaster is such that the main bimetal bar has flexed sufficiently, because of a rise in temperature of the toaster structure and of the bimetal bar, to engage arm 129 and cause a slight turning movement of the ratchet lever. Since the normal or cold position of bimetal bar 127 is that shown in Fig. 5, that is, substantially, straight and spaced from arm 129, a predetermined change in temperature must occur before the bimetal bar engages arm 129. Supporting bar 141 and bracket arm 121 are shown in their uppermost positions, a relatively large change in temperature being required to cause bimetal bar 127 to flex sufficiently to engage and move arm 129. If bar 141 and arm 121 are moved downwardly as by lever arm 147, the same change in temperature would cause the bimetal bar 127 to engage the movement of the arm 129 sooner, or after a smaller change in temperature. A downward movement of the bimetal thermostat will therefore cause earlier termination of an operating period of a toaster, thus providing a simple manually operable means for varying the duration of an operating period of a toaster.

The timer 85 may have projections 151 on one or both of its side plates at the bottom edge, which projections are adapted to fit into cooperating openings in plate 17 and a bracket 153 may fit loosely over the top of the timer and be held against front intermediate plate 27 by one or more small machine screws 155.

The device embodying my invention thus provides a thermally controlled toaster embodying a constant speed mechanical timer so designed and constructed that it is fully wound by a downward movement of knob 55 through a fixed distance to fully wind the spring of the timer, which then proceeds to unwind. The same downward movement simultaneously effects closing of the switch, movement of the bread slice supports into toasting position and latching them in those positions. A thermally-actuable element subjected not only to the relatively high temperature radiant heat from the heating means, but also to a closed circuit convection current of heating air of relatively high temperature and shielded from cooling drafts of external air and from air currents not of substantially toasting chamber temperature is adapted to move a ratchet lever adapted to act on the latch into the path of the return movement of a part of the timer to cause termination of a toasting operation before the expiration of an operating period of the timer. The interengagement between the ratchet lever and the ratchet wheel is positive and there will be no uncertainty as to the exact moment of release of the latch as is common in other structures where springs are or may be used. After release of the latch, the ratchet wheel will move along the engaging ratchet lever so that the mechanical timer may fully unwind if sufficient length of time is given it to do so.

In order to increase the sensitivity of the interengagement between the ratchet lever 117 and ratchet wheel 97, I may make the pitch of the teeth different in the ratchet wheel than is the case in the ratchet lever. Thus, if the pitch of the teeth in the ratchet lever is 3 units, and that of the teeth in the ratchet wheel is 2 units, the accuracy or sensitivity of engagement is increased to one-half of the pitch of the teeth on the ratchet wheel. It is thus possible to obtain much more accurate release of the latch or, to state it in other words, to terminate the toasting operation at a desired time within a very small leeway of time.

It may also be noted that the shape of the ratchet bar is not necessarily limited to the substantially straight form illustrated, but that it may be curved or otherwise modified so that the effect of the thermally-actuable element may be increased or decreased at particular points in its progressive deflection.

Various modifications may be made in the device embodying my invention without departing from the spirit and scope thereof and I desire that only such limitations shall be placed thereon as are imposed by the prior art or are set forth in the appended claims.

I claim as my invention:

1. In an automatic toaster, the combination with an electric heater, a switch biased to open position for controlling said heater, a constant speed mechanical timer, a single means movable through a constant distance to effect closing of said switch and a latch for holding the switch closed, said latch having two arms, of means on the timer to be operatively engaged by the movable winding means to effect winding of the timer simultaneously with the closing of the switch and to effect return of the movable means to its initial position and operative engagement thereof with one of the arms of said latch at substantially the end of an operating period of the timer to cause release of the latch, a ratchet lever pivotally mounted on the other arm of said latch and a thermally-actuable element subjected to toaster temperature and effective to move the ratchet lever into the path of said returning movable means on the timer and into positive engagement therewith to cause release of the latch before the end of an operating period of the timer.

2. In an automatic toaster, the combination with an electric heater, a switch biased to open position for controlling the energization of said heater, a mechanical timer, a movable means connected for closing of said switch and a latch for holding the switch closed, said latch having two arms, of a member on the timer operatively engageable by the movable winding means to effect winding of the timer simultaneously with the closing of the switch and to effect return of the movable winding means to its initial position, said movable winding means having a portion effective to engage one of said latch arms at the end of an operating period of the timer to effect release of the latch, a member pivotally mounted on the other arm of said latch and a thermally-actuable element subjected to toaster temperature to move the pivotally mounted member into the path of said member on the timer to effect release of the latch before the end of an operating period of the timer, said timer being free to unwind fully after each operation.

3. In an automatic toaster, the combination with an electric heater, a control switch for the heater biased to open position, a mechanical timer and a means for simultaneously effecting closing of said switch and winding of the timer, of a two-part latch for holding the switch in closed position, means controlled by the timer effective to operatively engage one of said latch parts to effect release of the latch at substantially the end of an operating period of the timer and means controlled jointly by the timer and by toaster temperature to actuate the other latch part to effect release of the latch after a time interval before the end of the operating period of the timer, the length of said time interval varying with varying toaster temperature the timer being free to unwind fully after release by said other latch part.

4. In an automatic toaster, the combination with an electric heater, a control switch for the heater biased to open position, a constant speed mechanical timer and a means movable through a fixed distance to simultaneously effect closing of said switch and winding of the timer, of a two-part latch means for holding the switch in closed position, means moved by the timer during its unwinding period to operatively engage one of said latch parts at substantially the end of its unwinding period to effect release of the latch and means controlled by the timer and by toaster temperature to actuate the other latch part before the end of the unwinding period of the timer to effect release of the latch, the time interval before said second means becomes effective varying in accordance with toaster temperature.

5. In an automatic toaster, the combination with an electric heater, a control switch for the heater biased to open position, a constant speed mechanical timer having means thereon including a ratchet wheel movable first in one and then in the opposite direction, and a means movable through a fixed distance in said one direction and connected to effect closing of said switch and full winding of the timer, of a two-part latch for holding the switch in closed position, a member on said movable means to engage one part of said latch at substantially the end of its movement in the opposite direction to effect release of the latch, a ratchet lever connected with the other part of the latch and a thermal element subject to toaster temperature to move the ratchet lever into the path of movement of the ratchet wheel when moving in said opposite direction to cause release of the latch after a time interval the length of which varies with changes in toaster temperature, the timer being free to unwind fully to its initial condition irrespective of when the latch is actuated by the ratchet lever.

6. An automatic toaster comprising an electric heater, a control switch therefor biased to open position, a constant speed mechanical timer having means thereon including a ratchet wheel adapted to move in one and then in the opposite direction, a single means movable through a fixed distance in said one direction and effective to have interlocking engagement with said movable means on the timer to fully wind the same and connected to simultaneously cause closing of said switch, a two-part latch for holding the switch closed, a member on said single movable means to engage one part of said latch at substantially the end of its movement in the opposite direction to cause release of said latch, a ratchet lever connected with the other part of said latch and a thermal element subject to toaster temperature effective to move the ratchet lever into the path of travel of the ratchet wheel when the same is moving in said opposite direction to be engaged with said ratchet wheel and cause release of the latch after a length of time varying with toaster temperature and simultaneous breaking of said interlocking engagement whereby the timer may unwind fully irrespective of when the latch is actuated by the ratchet lever.

7. An automatic toaster comprising an electric heater, a control switch for the heater biased to open position, a constant speed mechanical timer, a single means connected for simultaneously causing closing of said switch and winding of the timer by movement through a fixed distance in one direction and adapted to be moved in the opposite direction by the timer during unwinding thereof, the connection between the single movable means and the timer including a ratchet wheel on the timer positively interlocked with said single means to prevent turning of the ratchet wheel, a two-part latch for holding the switch in closed position, one part of said single movable means being effective to engage one part of said latch at substantially the end of the unwinding period of the timer to cause release of the latch and a thermally movable ratchet lever mounted on said other part of the latch adapted to be moved into the path of travel of the ratchet wheel when moving in the opposite direction to effect release of the latch and then of the ratchet wheel before the timer has been fully unwound, the released ratchet wheel enabling the timer to unwind fully irrespective of when the latch is thermally released.

8. A toaster as set forth in claim 5 in which the thermal element is supported solely from the timer and including means for moving the thermal element relatively to the timer to vary the length of time interval after which the ratchet lever is caused to engage the ratchet wheel to effect release of the latch.

9. An automatic toaster comprising an electric heater, a control switch for the heater, a bread slice support movable into toasting and non-toasting position relatively to the heater, a single means for biasing the switch to open position and the bread slice support to non-toasting position, a constant speed mechanical timer, a single means to simultaneously move the bread slice support to toasting position, effect closing of the switch and winding of the timer, a plural arm latch to hold the bread slice support in toasting position and the switch in closed position during a toasting operation and means to selectively actuate said latch arms to cause release of the latch after a toasting operation, one of said means being controlled by the timer to actuate one of said latch arms after a fixed time interval and another of said means including a thermal element connected to act on another of said latch arms to cause release of the latch after a shorter time interval the length of which varies with toaster temperature, said timer being free to unwind fully after each toasting operation.

10. A toaster as set forth in claim 9 and including a support for the thermal element to position it in a closed circuit convection current of heating air and subject also to radiant heat of relatively high temperature directly from the electric heater.

11. An automatic toaster comprising an electric heater, a control switch for the heater biased to open position, a constant speed mechanical timer including a spring actuated shaft having a pinion secured thereto, a rack bar operatively engaged with said pinion, and a pinion and a ratchet wheel mounted loosely and coaxially on said rack bar, a single movable means having a portion connected to cause closing of said switch and having another portion adapted to have interlocking engagement with the pinion on the rack bar to effect winding of the timer simultaneously with the closing of said switch, a plural arm latch for holding the switch closed and plural means to selectively actuate said latch arms to cause release of the latch after a toasting operation, one of said means including a portion of the single movable means adapted to actuate one of said latch arms and cause release of the latch at substantially the end of the operating period of the timer and the other of said means including a ratchet lever pivotally mounted on the other of said arms and a thermally-actuable element subject to toaster temperature for acting on said ratchet lever and moving it into the path of return travel of said locked ratchet wheel to positively engage therewith and be moved thereby to cause release of said latch after a length of time less than the operating period of said timer and varying with temperature changes in the toaster, said locked ratchet wheel on the rack bar being releasable from the interlocking engagement with said portion of the movable means and from said positive engagement with the ratchet lever after release of the latch so that the timer may unwind fully after each toasting operation.

12. A toaster as set forth in claim 11 in which the single movable means is adapted to be moved manually by an operator at any time during a toasting operation to effect release of said latch.

13. A toaster as set forth in claim 11 in which the ratchet wheel and the ratchet lever respectively have teeth of different pitch to increase the time accuracy of engagement therebetween.

14. In a toaster, the combination with electric heating means, a switch for controlling the said electric heating means, a bread slice support movable into toasting and non-toasting position relative to the heating means, a single means for biasing the switch to open position and the bread slice support to non-toasting position, a constant speed mechanical timer and a latch to hold the switch in closed position and the bread slice support in toasting position, of a single means adapted to be moved through a fixed distance in one direction to cause full winding of the timer, movement of the switch to closed position and movement of the bread slice support to toasting position, said single means being movable in the opposite direction by the timer to cause release of the latch after a predetermined length of time and being also movable by an operator in the opposite direction irrespective of the timer to cause release of the latch at any desired time and thermally-controlled means supported solely by said latch and connected to operatively engage with said movable means during its movement in the opposite direction by the timer to cause release of the latch before the expiration of said predetermined length of time, the timer being free to unwind fully irrespective of when the latch is released.

15. An automatic toaster comprising an electric heater, a control switch for the heater, a bread slice support movable into toasting and non-toasting position relatively to said heater, a single means for biasing the switch to open position and the bread slice support to non-toasting position, a constant speed mechanical timer, a single means connected to effect simultaneous winding of the timer, moving of the bread slice support into toasting position and of the switch into closed position, a plural arm latch to hold the bread slice support in toasting position and the switch in closed position and means to selectively actuate said arms to cause release of the latch after a toasting operation, one of said release means including a thermostat controlled in accordance with toaster temperature to actuate one of said arms after a time interval the length of which varies with toaster temperature and the other of said release means being effective to actuate the other of said latch arms after a fixed time interval and being controlled by said timer, said timer being free to unwind fully after each toasting operation, said thermally-controlled latch release means including a ratchet lever pivotally mounted on said one latch arm movable by said thermostat and having teeth of a given pitch and a ratchet wheel movable by the timer in a path intersected by the ratchet lever when moved by the thermal element to engage with the ratchet lever and move said other latch arm, the pitch of the ratchet wheel teeth being different than that of the teeth of the ratchet lever to increase the sensitivity of operation of the ratchet lever and ratchet wheel.

16. An automatic toaster comprising a heating means, a control switch for the heating means biased to open position and movable into closed position, a bread slice support movable into toasting and non-toasting position relatively to said heating means and biased to non-toasting position, a plural arm latch for holding the switch in closed position and the bread slice support in toasting position, a timer having a member thereon movable in one direction to wind the timer and movable in a return direction by the timer during unwinding thereof, manually-actuable means for causing latch-releasing movement of one of said latch arms and thermally-actuable means for cooperating with said movable member on the timer when moving in the return direction for causing latch-releasing movement of the other latch arm.

17. An automatic toaster comprising a heating means, a control switch for the heating means biased to open position and movable into closed position, a bread slice support movable into toasting and non-toasting position relatively to said heating means and biased to non-toasting position, a plural arm latch for holding the switch in closed position and the bread slice support in toasting position, a timer having a member thereon movable in one direction to wind the timer and movable in a return direction by the timer during unwinding thereof, manually-actuable means for operatively engaging one of said latch arms to cause release of the latch and thermally-actuable means for cooperating with said movable member on the timer when moving in the return direction for causing latch-releasing movement of the other latch arm.

18. A device as set forth in claim 16 in which said movable member on the timer includes a ratchet wheel and in which said thermally-actuable means includes a ratchet lever pivotally mounted on said other latch arm and supported solely thereby.

19. An automatic electric toaster comprising a heating means, a control switch therefor biased to open position, a bread slice support movable into toasting and non-toasting positions and biased to non-toasting position, a timer, means to move said switch to closed position and the bread slice support to toasting position, a latch for holding said switch in closed position and said bread support in toasting position, a member connected with said timer to be moved by said switch moving means in one direction to wind the timer and to be moved in a return direction by the timer during unwinding thereof and a thermally-controlled member supported solely by said latch movable into the path of return travel of said movable member to effect release of said latch and termination of a toasting operation.

20. An automatic electric toaster comprising a heating means, a control switch therefor biased to open position, a bread slice support movable into toasting and non-toasting positions and biased to non-toasting position, a timer, means to move said switch to closed position and the bread slice support to toasting position, a latch for holding said switch in closed position and said bread support in toasting position, a member connected with said timer to be moved by said switch moving means in one direction to wind the timer and to be moved in a return direction by the timer during unwinding thereof, a member pivotally mounted on and supported solely by said latch movable into the path of return travel of said movable member to cause release of said latch and a thermally-controlled means responsive to toaster temperature for causing movement of said pivotally mounted member into the path of return travel of said movable member to effect release of said latch and termination of a toasting operation.

ROBERT SARDESON.